(12) United States Patent
Zhang et al.

(10) Patent No.: US 11,260,972 B2
(45) Date of Patent: Mar. 1, 2022

(54) SYSTEMS AND METHODS FOR A FOLDABLE UNMANNED AERIAL VEHICLE HAVING A LAMINATE STRUCTURE

(71) Applicants: Wenlong Zhang, Tempe, AZ (US); Dangli Yang, Tempe, AZ (US); Daniel Aukes, Tempe, AZ (US)

(72) Inventors: Wenlong Zhang, Tempe, AZ (US); Dangli Yang, Tempe, AZ (US); Daniel Aukes, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 488 days.

(21) Appl. No.: 16/255,610

(22) Filed: Jan. 23, 2019

(65) Prior Publication Data

US 2019/0225335 A1    Jul. 25, 2019

Related U.S. Application Data

(60) Provisional application No. 62/621,330, filed on Jan. 24, 2018.

(51) Int. Cl.
| | | |
|---|---|---|
| *B64C 39/02* | (2006.01) | |
| *B64C 27/20* | (2006.01) | |
| *B64C 1/00* | (2006.01) | |
| *B32B 29/00* | (2006.01) | |

(52) U.S. Cl.
CPC ............ *B64C 39/024* (2013.01); *B64C 27/20* (2013.01); *B32B 29/002* (2013.01); *B32B 2605/00* (2013.01); *B64C 2001/0072* (2013.01); *B64C 2201/027* (2013.01); *B64C 2201/108* (2013.01)

(58) Field of Classification Search
CPC ........... B32B 1/00; B32B 21/02; B32B 21/13; B32B 2262/101; B32B 2605/00; B32B 27/08; B32B 27/308; B32B 29/002; B32B 29/005; B32B 3/08; B32B 5/02; B32B 5/26; B64C 1/063; B64C 2001/0072; B64C 2201/027; B64C 2201/108; B64C 27/20; B64C 39/024
See application file for complete search history.

(56) References Cited

U.S. PATENT DOCUMENTS

| | | | | |
|---|---|---|---|---|
| 3,126,173 A | * | 3/1964 | Alvarez-Calderón | .... B64C 9/20 244/216 |
| 3,685,771 A | * | 8/1972 | Babich | ...................... B64F 1/16 244/115 |
| 4,494,580 A | * | 1/1985 | Loustau | ............... H02G 1/1248 140/1 |
| 4,605,183 A | * | 8/1986 | Gabriel | ..................... B64C 3/40 244/46 |
| 6,095,459 A | * | 8/2000 | Codina | ..................... B64C 9/32 244/213 |

(Continued)

OTHER PUBLICATIONS

U.S. Appl. No. 16/864,468, filed Sep. 27, 2019, Zhang et al.

(Continued)

*Primary Examiner* — Medhat Badawi
(74) *Attorney, Agent, or Firm* — Polsinelli PC

(57) ABSTRACT

Various embodiments of a foldable unmanned aerial vehicle having a multi-layer laminate structure and extendible arms are disclosed.

12 Claims, 7 Drawing Sheets
(7 of 7 Drawing Sheet(s) Filed in Color)

(56) References Cited

U.S. PATENT DOCUMENTS

| | | | | |
|---|---|---|---|---|
| 6,783,096 | B2* | 8/2004 | Baldwin | B64C 11/001 244/12.4 |
| 8,052,081 | B2* | 11/2011 | Olm | B64C 39/024 244/17.23 |
| 9,272,784 | B2* | 3/2016 | Nelson | B64C 39/024 |
| 9,487,224 | B1* | 11/2016 | Pless | E06B 3/921 |
| 9,522,732 | B1* | 12/2016 | Froloff | B64C 39/024 |
| 9,527,588 | B1* | 12/2016 | Rollefstad | G05D 1/0005 |
| 9,540,101 | B2* | 1/2017 | Paduano | B64C 13/16 |
| 9,550,567 | B1* | 1/2017 | Erdozain, Jr | B64C 29/02 |
| 9,573,683 | B2* | 2/2017 | Martin | B64C 39/024 |
| 9,919,797 | B2* | 3/2018 | Chan | B64C 27/08 |
| 9,981,741 | B2* | 5/2018 | Hutson | B64C 39/024 |
| 10,266,252 | B2* | 4/2019 | Anderson | B64C 29/0033 |
| 10,279,892 | B2* | 5/2019 | Bosworth | B64C 29/0033 |
| 10,351,235 | B2* | 7/2019 | Karem | B64C 11/325 |
| 10,370,100 | B2* | 8/2019 | Rothhaar | B64C 29/0033 |
| 10,370,120 | B1* | 8/2019 | McGann | B64F 1/06 |
| 2003/0104738 | A1* | 6/2003 | Porter | B32B 5/28 442/134 |
| 2004/0169405 | A1* | 9/2004 | Stinnes | B64C 31/028 297/216.1 |
| 2007/0034749 | A1* | 2/2007 | Wagner, III | B64C 3/54 244/218 |
| 2010/0044499 | A1* | 2/2010 | Dragan | B64C 27/08 244/17.23 |
| 2014/0217230 | A1* | 8/2014 | Helou, Jr. | B64C 39/024 244/17.17 |
| 2014/0339355 | A1* | 11/2014 | Olm | B64C 39/024 244/17.23 |
| 2015/0259066 | A1* | 9/2015 | Johannesson | B64C 1/30 244/17.27 |
| 2016/0059433 | A1* | 3/2016 | Ulrich | B21D 28/02 29/897 |
| 2016/0122016 | A1* | 5/2016 | Mintchev | B64C 39/024 244/17.23 |
| 2016/0170384 | A1* | 6/2016 | Charest-Finn | G05B 13/048 700/44 |
| 2016/0176520 | A1* | 6/2016 | Goldstein | B64C 39/024 244/17.17 |
| 2016/0272310 | A1* | 9/2016 | Chan | B64D 1/00 |
| 2016/0376004 | A1* | 12/2016 | Claridge | B64C 27/08 701/3 |
| 2017/0036771 | A1* | 2/2017 | Woodman | B64C 25/54 |
| 2017/0043870 | A1* | 2/2017 | Wu | B64C 1/30 |
| 2017/0166308 | A1* | 6/2017 | Desrochers | B64C 39/024 |
| 2017/0197703 | A1* | 7/2017 | Wood | B64C 39/024 |
| 2017/0247098 | A1* | 8/2017 | Sanlaville | B64C 1/063 |
| 2017/0247106 | A1* | 8/2017 | Sanlaville | B64C 25/20 |
| 2017/0291697 | A1* | 10/2017 | Kornatowski | B64C 27/20 |
| 2017/0313400 | A1* | 11/2017 | Zhydanov | B64C 1/063 |
| 2018/0105254 | A1* | 4/2018 | Tian | B64C 27/08 |
| 2018/0281933 | A1* | 10/2018 | Davis | B64C 25/12 |
| 2018/0281949 | A1* | 10/2018 | Mitchell | B64C 11/48 |
| 2018/0327092 | A1* | 11/2018 | Deng | B64C 1/30 |
| 2019/0143517 | A1* | 5/2019 | Yang | G06N 3/0454 700/245 |
| 2019/0176324 | A1* | 6/2019 | Aukes | B25J 9/163 |
| 2019/0225335 | A1* | 7/2019 | Zhang | B32B 5/26 |
| 2020/0307755 | A1* | 10/2020 | Zhang | B64C 39/024 |

OTHER PUBLICATIONS

B. Goldberg, N. Doshi, K. Jayaram, and R. Wood, "Gait studies for a quadrupedal microrobot reveal contrasting running templates in two frequency regimes," Bioinspiration & Biomimetics, vol. 12, No. Jan. 2017.

Bell Boeing AV22 Osprey, http://www.bellhelicopter.com/military/bell-boeing-v-22, 2016.

C. Hintz, C. Torno, and L. R. G. Carrillo, "Design and dynamic modeling of a rotary wing aircraft with morphing capabilities," in Unmanned Aircraft Systems (ICUAS), 2014 International Conference on. IEEE, 2014, pp. 492-498.

C. Holda, B. Ghalamchi, and M. W. Mueller, "Tilting multicopter rotors for increased power efficiency and yaw authority," in 2018 International Conference on Unmanned Aircraft Systems (ICUAS). IEEE, 2018, pp. 143-148.

CD. Onal, MT. Tolley, RJ. Wood, et al., Origami-inspired printed robots. IEEE/ASME Transactions on Mechatronics 20.5 (2015): 2214-2221.

CN. Onal, RJ. Wood, D. Rus, Towards printable robotics: Origami-inspired planar fabrication of three-dimensional mechanisms, Robotics and Automation (ICRA), 2011 IEEE International Conference on. IEEE, 2011.

D. Mellinger and V. Kumar, "Minimum snap trajectory generation and control for quadrotors," in Robotics and Automation (ICRA), 2011 IEEE International Conference on. IEEE, 2011, pp. 2520-2525.

D. Mellinger, Trajectory generation and control for quadrotors. University of Pennsylvania, 2012.

D. W. Haldane, K. C. Peterson, F. L. Garcia Bermudez, and R. S. Fearing, "Animal-inspired design and aerodynamic stabilization of a hexapedal millirobot," 2013 IEEE International Conference on Robotics and Automation, pp. 3279-3286, May 2013.

E. Vander Hoff, D. Jeong, and K. Lee, "Origamibot-i: A thread-actuated origami robot for manipulation and locomotion," in Intelligent Robots and Systems (IROS 2014), 2014 IEEE/RSJ International Conference on. IEEE, 2014, pp. 1421-1426.

G. Andrew, Quadcopter dynamics and simulation, http://andrew.gibiansky.com/blog/physics/quadcopter-dynamics/, Nov. 23, 2012.

G. Xiaoliang, P. Jinhua, Y. Zhongqing, et al., Movement Characteristic of UAV Folding Wings, Journal of Nanjing University of Aeronautics & Astronautics 4 (2006): 008.

H. Tsukagoshi, M. Watanabe, T. Hamada, et al., Aerial manipulator with perching and door-opening capability, Robotics and Automation (ICRA), 2015 IEEE International Conference on. IEEE, 2015.

I. L. Delimont, S. P. Magleby, and L. L. Howell, "Evaluating compliant hinge geometries for origami-inspired mechanisms," Journal of Mechanisms and Robotics, vol. 7, No. 1, p. 011009, 2015.

IR. Lefeber, E Biever. Controlling of a single drone; 2015.

J. P. Whitney, P. S. Sreetharan, K. Y. Ma, and R. J. Wood, "Pop-up book MEMS," Journal of Micromechanics and Microengineering, vol. 21, No. 11, p. 115021, Nov. 2011.

J.-s. Koh, D. M. Aukes, B. Araki, S. Pohorecky, Y. Mulgaonkar, M. T. Tolley, V. Kumar, D. Rus, and R. J. Wood, "A Modular Folded Laminate Robot Capable of Multi Modal Locomotion," ISER 2016, vol. 1, pp. 1-12, 2017.

JK. Paik, A. Byoungkwon. D. Rus, et al., Robotic Origamis: Self-Morphing Modular Robot., ICMC. No. EPFL-CONF-206919. 2012.

K. Y. Ma, P. Chirarattananon, S. B. Fuller, and R. J. Wood, "Controlled Flight of a Biologically Inspired, Insect-Scale Robot," Science, vol. 340, No. 6132, pp. 603-607, May 2013.

L. Dufour, K. Owen, S. Mintchev, et al., A drone with insect-inspired folding wings, Intelligent Robots and Systems (IROS), 2016 IEEE/RSJ International Conference on. Ire, 2016.

L. Henderson, T. Glaser, and F. Kuester, "Towards bio-inspired structural design of a 3D printable, balfistically deployable, multi-rotor UAV," in Aerospace Conference, 2017 IEEE. IEEE, 2017, pp. 1-7.

L. Teppo, Modeling and control of UAV, Independent research project in applied mathematics, Espoo, Finland, pp. 1-6, 2011.

N. Zhao, Y. Luo, H. Deng, and Y. Shen, "The deformable quadrotor: Design, kinematics and dynamics characterization, and flight performance validation," in Intelligent Robots and Systems (IROS), 2017 IEEE/RSJ International Conference on. IEEE, 2017, pp. 2391-2396.

P. Birkmeyer, K. Peterson, and R. S. Fearing, "DASH: A dynamic 16g hexapedal robot," 2009 IEEE/RSJ International Conference on Intelligent Robots and Systems, pp. 2683-2689, cot 2009.

(56) References Cited

OTHER PUBLICATIONS

P. E. Pounds, D. R. Bersak, and A. M. Dollar, "Stability of small-scale UAV helicopters and quadrotors with added payload mass under pid control," Autonomous Robots, vol. 33, No. 1-2, pp. 129-142, 2012.

P. M. Komatowski, S. Mintchev, and D. Floreano, "An origami-inspired cargo drone," in IEEE/RSJ International Conference on Intelligent Robots and Systems, No. EPFL-CONF-230988, 2017.

P. S. Sreetharan, J. P. Whitney, M. D. Strauss, and R. J. Wood, "Monolithic fabrication of millimeter-scale machines," Journal of Micromechanics and Microengineering, vol. 22, No. 5, p. 055027, May 2012.

S. Jun, J. Heirons, B. Sanz-Izquierdo, Inkjet printed dual band antenna for paper UAVs, University of Kent, Canterbury, Kent, UK, 11th EUCAP, 2017.

S. Jun, R. Samuel, S. Bryan, et al., A foldable antagonistic actuator, IEEE/ASME, Transactions on mechatronics, vol. 20, No. 5, Oct. 2015.

S. Mintchev and D. Floreano, "A multi-modal hovering and terrestrial robot with adaptive morphology," in Proceedings of the 2nd International Symposium on Aerial Robotics, No. CONF, 2018.

S. Mintchev, D. Stefano, F. Dario, A pocket sized foldable quadcopter for situational awareness and reconnaissance, Safety, Security, and Rescue Robotics (SSRR), 2016 IEEE International Symposium on. IEEE, 2016.

S. Miyashita, S. Guitron, M. Ludersdorfer, et al., An untethered miniature origami robot that self-folds, walks, swims, and degrades, Robotics and Automation (ICRA), 2015 IEEE International Conference on. IEEE, 2015.

S.-J. Kim, D.-Y. Lee, G.-P. Jung, and K.-J. Cho, "An origami-inspired, self-locking robotic arm that can be folded flat," Science Robotics, vol. 3, No. 16, p. eaar2915, 2018.

SD. Landon, SP. Magleby, LL. Howell, Preliminary concepts for deployable wings on small AUV using compliance. Proc. ASME Int. Mech. Eng. Congr. Expo (2005): 353-363.

SW. Cheng, Rapid deployment UAV, Aerospace Conference, IEEE. 2008.

T. Fernando, J. Chandiramani, T. Lee, and H. Gutierrez, "Robust adaptive geometric tracking controls on so (3) with an application to the attitude dynamics of a quadrotor UAV," in Decision and Control and European Control Conference (CDC-ECC), 2011 50th IEEE Conference on. IEEE, 2011, pp. 7380-7385.

T. Lee, M. Leoky, and N. H. McClamroch, "Geometric tracking control of a quadrotor UAV on se (3)," in Decision and Control (CDC), 2010 49th IEEE Conference on. IEEE, 2010, pp. 5420-5425.

T. Narges, R. Vadana, H. Greg, et al., A comparative study of conventional and coreless axial flux permanent magnet synchronous motors for solar cars, University of Kentucky, Lexington, KY, US, Regal Beloit Corp., Rowville, Australia, IEEE, 2017.

V. Riviere, A. Manecy, and S. Viollet, "Agile robotic fliers: A morphing-based approach," soft robotics, 2018.

Y. Mulgaonkar, B. Araki, J.-s. Koh, L. Guerrero-Bonilla, D. M. Aukes, A. Makineni, M T. Tolley, D. Rus, R. J. Wood, and V. Kumar, "The flying monkey: A mesoscale robot that can run, fly, and grasp," in 2016 IEEE International Conference on Robotics and Automation (ICRA). IEEE, May 2016, pp. 4672-4679.

Z. Liu, D. Theilliol, L. Yang, Y. He, and J. Han, "Transition control of tilt rotor unmanned aerial vehicle based on multi-model adaptive method," in Unmanned Aircraft Systems (ICUAS), 2017 International Conference on. IEEE, 2017, pp. 560-566.

Z. Tao, Z. Chaoying, S. Steven, Design and development of bio-inspired flapping wing aerial vehicles, IEEE, 2015.

Z. Zhakypov, M. Falahi, M. Shah, et al., The design and control of the multi-modal locomotion origami robot, Tribot, Intelligent Robots and Systems (IROS), 2015 IEEE/RSJ International Conference on. IEEE, 2015.

Amazon., "Holy Stone HS160 Shadow FPV RC Drone with 720P HD WiFi Camera Live Video Feed 2.4 GHz 6-Axis Gyro Quadcopter with Altitude Hold One Key Start Extra Battery, Color Black" [online], Amazon, 2019 [retrieved Jan. 4, 2019], retrieved from the internet: <URL:https://www.amazon.com/dp/B074S2HK59/ref=cm_sw_r_cp_ep_dp_ks7ICbHFDXS19>.

Falanga, D. et al., "The Foldable Drone: A Morphing Quadrotor That Can Squeeze and Fly", IEEE Robotics and Automation Letters, Apr. 2019 [IEEE Date of Publication: Dec. 2018], vol. 4, No. 2, pp. 209-216 <DOI:10.1109/LRA.2018.2885575>.

Floreano, D. et al., "Foldable drones: from biology to technology", Proceedings of SPIE, Bioinspiration, Biometrics, and Bioreplication 2017 (Portland, Oregon, Mar. 25-29, 2017), May 2017, vol. 10162, article 1016203, 6 pages <DOI:10.1117/12.2259931>.

Mintchev, S. et al., "Foldable and Self-Deployable Pocket Sized Quadrotor", Proceedings of the 2015 IEEE International Conference on Robotics and Automation (Seattle, Washington, May 26-30, 2015), Jul. 2015, pp. 2190-2195 <DOI:10.1109/ICRA.2015.7139488>.

Mintchev, S. et al., "Insect-Inspired Mechanical Resilience for Multicopters", IEEE Robotics and Automation Letters, Jul. 2017 [IEEE Date of Publication: Jan. 2017], vol. 2, No. 3, pp. 1248-1255 <DOI:10.1109/LRA.2017.2658946>.

Zhao, M. et al., "Design, Modeling, and Control of an Aerial Robot DRAGON: A Dual-Rotor-Embedded Multilink Robot With the Ability of Multi-Degree-of-Freedom Aerial Transformation", IEEE Robotics and Information Letters, Apr. 2018 [IEEE Date of Publication: Jan. 2018], vol. 3, No. 2, pp. 1176-1183 <DOI:10.1109/LRA.2018.2793344>.

Zhao, M. et al., "Whole-body Aerial Manipulation by Transformable Multirotor with Two-dimensional Multilinks", Proceedings of the 2017 IEEE International Conference on Robotics and Automation (Singapore, May 29-Jun. 3, 2017), 2017 [Date Added to IEEE Xplore: Jul. 2017], pp. 5175-5182 <DOI:10.1109/ICRA.2017.7989606>.

Amazon, Holy Stone HS160 Shadow FPV RC Drone with 720P HD Wi-Fi Camera Live Video Feed 2.4GHz 6-Axis Gyro Quadcopter for Kids & Beginners—Altitude Hold, One Key Start, Foldable Arms, Bonus Battery, https://www.amazon.com/dp/B074S2HK59/ref=cm_sw_r_cp_ep_dp_ks7ICbHFRDXS19, Jan. 4, 2019.

Falanga et al., The Foldable Drone: A Morphine Quadrotor That Can Squeeze and Fly, IEEE Robotics and Automation Letters, vol. 4, No. 2, Apr. 2019 (first available Dec. 2018), pp. 209-216.

Floreano et al., Foldable Drones: From Biology to Technology, Proceedings of SPIE, https://www.spiedigitallibrary.org/conference-proceedings-of-spie on Jan. 4, 2019 Terms of Use: https:www.spiedigitallibrary.org/terms-of-use, 7 pages.

Mintchev et al., Foldable and Self-Deployable Pocket Sized Quadrotor, 2015 IEEE International Conference on Robotics and Automation (ICRA), Washington State Convention Center, Seattle, Washington, May 26-30, 2015, 6 pages.

Mintchev et al., Insect-Inspired Mechanical Resilience for Multicopters, IEEE Robotics and Automation Letters, vol. 2, No. 3, Jul. 2017, 8 pages.

Riviere et al., Agile Robotic Fliers: A Morphing-Based Approach, Soft Robotics, vol. 5, Nos. 2018, 13 pages.

Zhao et al., Whole-body Aerial Manipulation by Transformable Multirotor with Two-dimensional Multilinks, 2017 IEEE International Conference on Robotics and Automation (ICRA), Singapore, May 29-Jun. 3, 2017, 8 pages.

Zhao et al., Design, Modeling, and Control of an Aerial Robot DRAGON: A Dual-Rotor-Embedded Multilink Robot With the Ability of Multi-Degree-of-Freedom Aerial Transformation, IEEE Robotics and Automation Letters, vol. 3, No. 2, Apr. 2018, 8 pages.

\* cited by examiner

SYSTEMS AND METHODS FOR A FOLDABLE UNMANNED AERIAL VEHICLE HAVING A LAMINATE STRUCTURE

CROSS REFERENCE TO RELATED APPLICATIONS

This is a non-provisional application that claims benefit to U.S. provisional application Ser. No. 62/621,330, filed on Jan. 24, 2018, which is herein incorporated by reference in its entirety.

FIELD

The present disclosure generally relates to portable unmanned aerial vehicles, and in particular, to systems and methods for foldable unmanned aerial vehicles having a laminate structure.

BACKGROUND

Unmanned Aerial Vehicles (UAVs) have been developed for over a decade. Mechanical engineers and computer scientists have come up with various functions and software codes to simulate and manipulate a UAV in multiple ways. In fact, unmanned aerial vehicles have become popular for environmental monitoring, search and rescue, package delivery and surveillance. However, the structure of existing UAVs is fixed, which limits their maneuverability and costs more energy to control the flight behavior of such UAVs.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

The present disclosure relates to changing the center of mass and moment of inertia of a foldable unmanned aerial vehicle (UAV) including developing a physical model of its laminate structure and operation. The present disclosure further relates to systems and methods for controlling the flight of a foldable UAV. To achieve this goal, it is important to understand and solve different challenges.

Traditional methods of connecting laminate structures together when constructing ground origami robots, for example using glue and/or friction connections when connecting together two laminate structures, are insufficient when constructing a UAV. In one aspect, the novel foldable UAV structure of the present disclosure is stronger than traditional laminate structures, such as an origami mechanism structure, because it needs to accommodate the stress of flight operations. To solve this problem, a connection method using slot and other permanent connecting methods were found to be the most reliable.

In another aspect, the structure of the foldable UAV is not as rigid as a traditional structure, such as metal and plastic, used to manufacture conventional UAVs. To accommodate the fact that the normal direction of the propeller for the foldable UAV may not be strictly parallel to the D-axis of the UAV body during flight (thereby making it difficult to control the UAV during flight), the laminated structure of the foldable UAV is constructed to be as stiff as possible in order to allow the foldable UAV to maintain the normal direction parallel to D-axis during flight.

Figure 3:
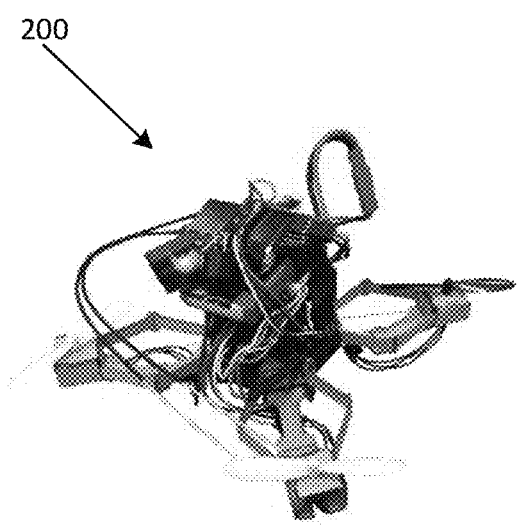
FIG. 3 is a perspective view of a second embodiment of the foldable unmanned aerial vehicle, according to aspects of the present disclosure.

In yet another aspect, the foldable UAV, designated 200, includes a processor as shown in FIG. 3 that is programmed with one or more algorithms that control the flight of the foldable UAV 200 by adjusting the position of the foldable UAV 200 during flight even when the thrust generated by the propellers is not a strictly downward thrust.

Figure 2:
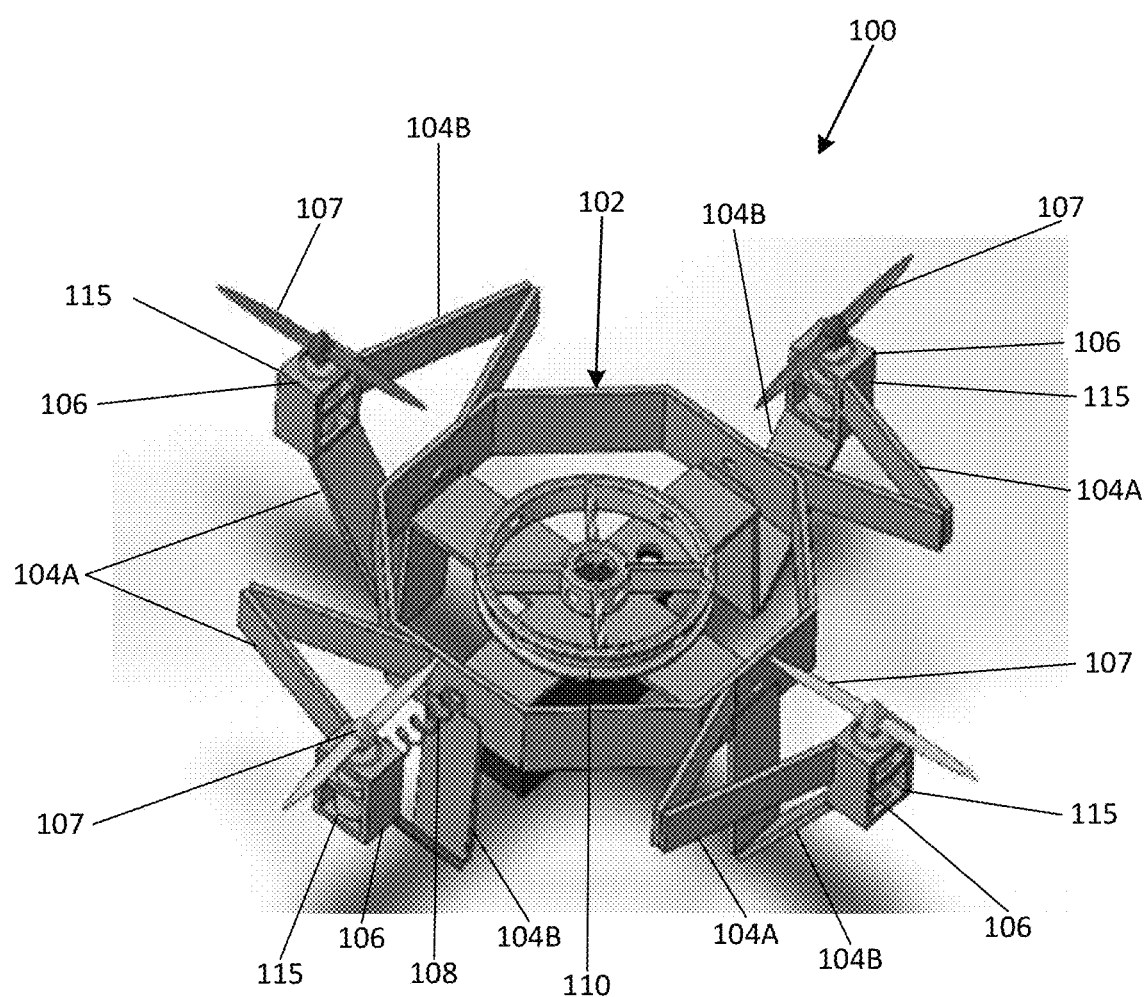
FIG. 2 is a perspective view of a first embodiment of the foldable unmanned aerial vehicle, according to aspects of the present disclosure.

In another aspect, the foldable UAV, designated 100, shown in FIG. 2, includes a plurality of extendable arms that may be articulated to change their lengths in order to control the flight of the foldable UAV when performing hovering, yawing, rolling and pitching motions.

In some embodiments, the articulation of the extendable arms during the flight is assumed to be zero. In one aspect, each extendable arm of the foldable UAV can be treated like a cantilevered beam during the stress analysis as shown in the simplified free body diagram of FIG. 1. When the extendable arms are articulated during flight, the thrust direction of the foldable UAV will no longer be vertically pointing upward. As such, the angle θ that each extendable arm is articulated will cause the thrust to become Tcos(θ) in the vertical direction, wherein T is the thrust generated. In addition, because the propellers of the foldable UAV are no longer parallel to the horizontal plane during flight, the momentum generated by each propeller will not only cause the foldable UAV to yaw, but also to also pitch and roll. Since the articulation of each extendable arm can be slightly different due to the slightly different mechanical structure of each extendable arm, the articulation action of a respective extendable arm can cause the foldable UAV to become unstable. However, since the foldable UAV may be controlled using a dynamic close loop control system and the articulation of the extendable arm is often less than 0.05, the articulation of the extendable arms during flight can be often ignored when modelling the dynamic close loop system to control the operation of the foldable UAV.

During flight testing, a first embodiment of the foldable UAV 100 shown in FIG. 2 produced no observable vibration during flight, therefore it was assumed to be no interference to the moment of inertia of the foldable UAV 100. The aim was to achieve fast rotation control of the foldable UAV 100. When the foldable UAV 100 was in the landing and hovering operations, the extendable arms 104 when in a fully extended position produced maximum moment of inertia to prevent unneeded yawing of the foldable UAV 100. When the foldable UAV 100 was in the air during flight, the foldable UAV 100 can conduct either symmetric or asymmetric extension of the extendable arms 104 to achieve faster rotation movement. As such, the extendable arms 104 may extend outwardly at different distances and at different times during flight to influence the rotation of the foldable UAV 100.

Figure 4:
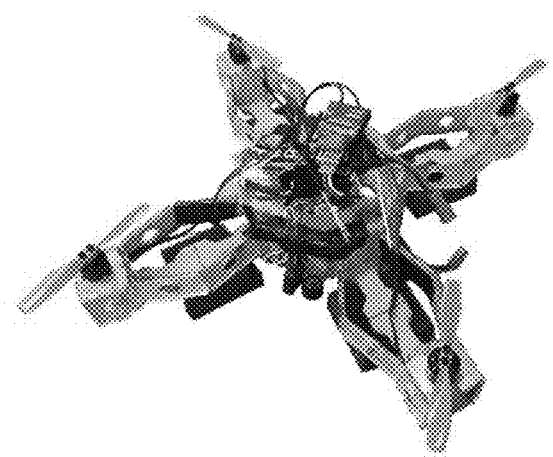
FIG. 4 is a perspective view of a third embodiment of the foldable unmanned aerial vehicle, according to aspects of the present disclosure.

Referring to FIG. 2, in some embodiments, the foldable UAV 100 includes a laminated structure 102 in which a processor controls the operation of a plurality of motors 106 and associated propellers 107 mounted on the foldable UAV 100. In some embodiments, the plurality of motors 106 are housed in respective mountings 115 that form a portion of the laminated structure 102. In some embodiments, each motor 106 is associated with a pair of perpendicular arms 104A and 104B which are restricted to one degree of freedom such that each motor 106 and propeller 107 combination can only move along one axis. In some embodiments, the foldable UAV 100 includes a string and spring mechanism 108 associated with each motor 106 that is connected to the center portion of the laminated structure 102. The string portion of the string and spring mechanism 108 is used to pull back the motors 106, while the spring 108 is used to push back the motors 106 in order to extend it back into its further position. The spring-string mechanism 108 maintains the close loop system in tension while also reducing the effects of vibrations. Finally, in some embodiments, a 3D-printed wheel 110 located in the center of the laminated structure 102 is connected to the servo motor (301). When the servo motor rotates, the string will be able to be pulled back or extended, as shown in FIG. 4. In one aspect, the design of asymmetric extendable arms 104 requires a degree of stiffness that restricts each extendable arm 104 to only one degree of freedom. To further reinforce the structure stiffness, in some embodiment three extendable arms 104 may be arranged in an equilateral triangular shape, e.g., 60 degrees, relative to each other with all three of the extendable arms 104 being perpendicular to one plane.

In some embodiments, the laminated structure 102 may be manufactured from cardboard, chipboard, an acrylic material, and fiberglass can be used. In some embodiments, the geometric size of the laminated structure 102 can also be increased depending on the weigh restriction imposed by the type of controller unit and the material used to manufacture the structure 102.

In one embodiment, the foldable UAV includes 6,500 KV type motors and a laminated structure 102 having equilateral-triangular-three extendable arms 104 configuration to produce a stiffer structure.

Referring to FIG. 4, in some embodiments the foldable UAV 300 may include a bigger frame made of an acrylic material to provide sufficient stiffness and maintain the center of mass lower compared to a smaller structure for the foldable UAV 300 since the processor sits on the top of the central structure.

Figure 5:
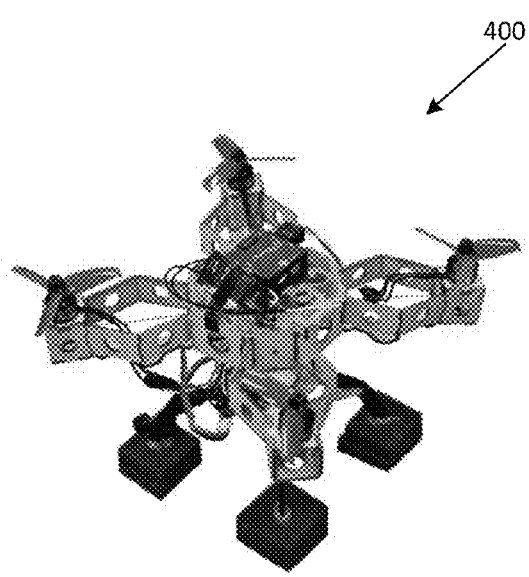
FIG. 5 is a perspective view of a fourth embodiment of the foldable unmanned aerial vehicle, according to aspects of the present disclosure.

In FIG. 5, the foldable UAV, designated 400, includes an F20 3750 KV type of motor. In this embodiment, the foldable UAV 400 can also drive a tri-propeller of 3 inches and provide over 300 g of thrust.

In one embodiment, the net payload of the foldable UAV 400 was found to be 1.2 kg, which is more than enough for the test platform. The foldable UAV, designated 300, shown in FIG. 4 also used acrylic, which is much thicker than cardboard, therefore the original design which didn't consider thickness, didn't work when each extendable arm started to bend. In the embodiment of the foldable UAV 400 shown in FIG. 5, the main material used to construct the foldable UAV 400 was cardboard, but the cardboard material was comprised of a nine-layer structure instead of five-layer structure. In this embodiment, the foldable UAV 400 is able to fold itself, take off stably and maintain a flight time of more than two minutes, which achieved the initial goals.

Figure 6:
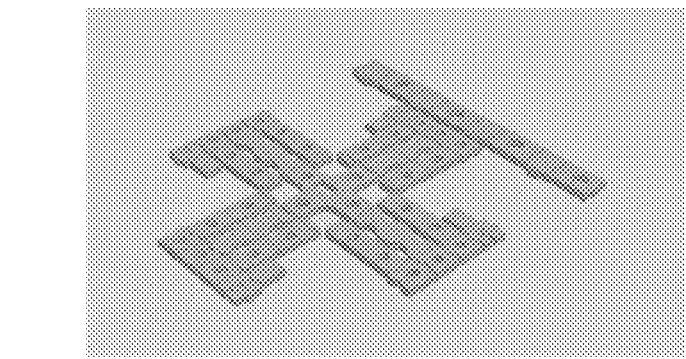
FIG. 6 is perspective view of a laminate structure template used to construct the foldable unmanned aerial vehicle, according to aspects of the present disclosure.

In one method of manufacturing, the foldable UAV 100, for example, may be manufactured by first cutting each layer of cardboard separately and then piling each layer of the foldable UAV 100 structure up in the correct sequence before applying heat and pressure with tools like T-shirt pad. After the layers of cardboard are strongly connected to each other, they are placed on a laser cutter and the outline of the foldable UAV is cut to obtain the main structure as shown in FIG. 6.

Figure 8:
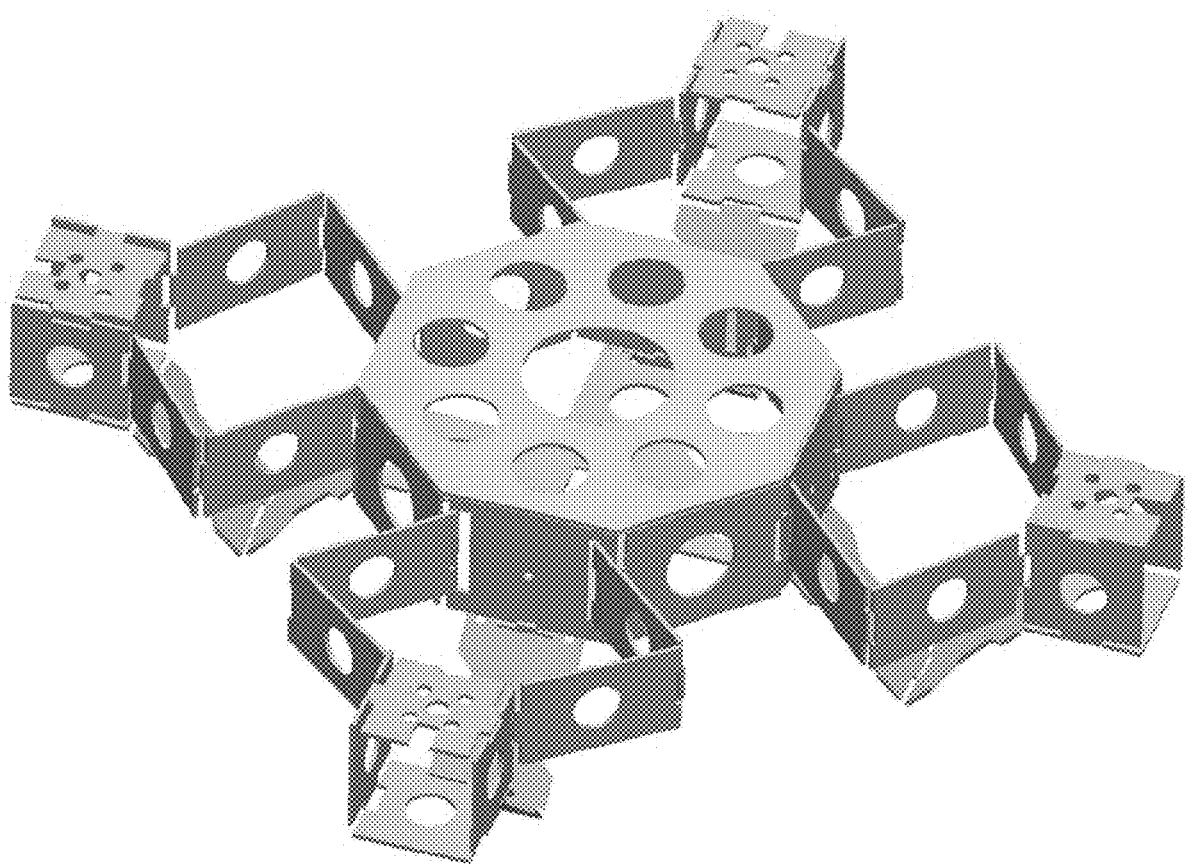
FIG. 8 is a perspective view of the assembled laminate structure constructed from the laminate structure template, according to aspects of the present disclosure.

After the main structure of the foldable UAV 100 is cut, the main structure is assembled until the laminate structure shown in FIG. 8 is achieved. Once the laminate structure in FIG. 8 is assembled, brushless motors and a servo motor may be installed to the main structure and the plastic from the center wheel is then engaged, which connects the servo motor to the extendable arms 104 of the foldable UAV 100 separately. In some embodiments, a glue gun may be used as an option for the fast manufacture and assembly of the foldable UAV 100; however, the glue gun only works when a cardboard structure is used to manufacture the foldable UAV 100 since it doesn't work well on an acrylic surface and can break during flight because of the strong motor vibration generated by the foldable UAV 100.

UAV Dynamics

Figure 1:
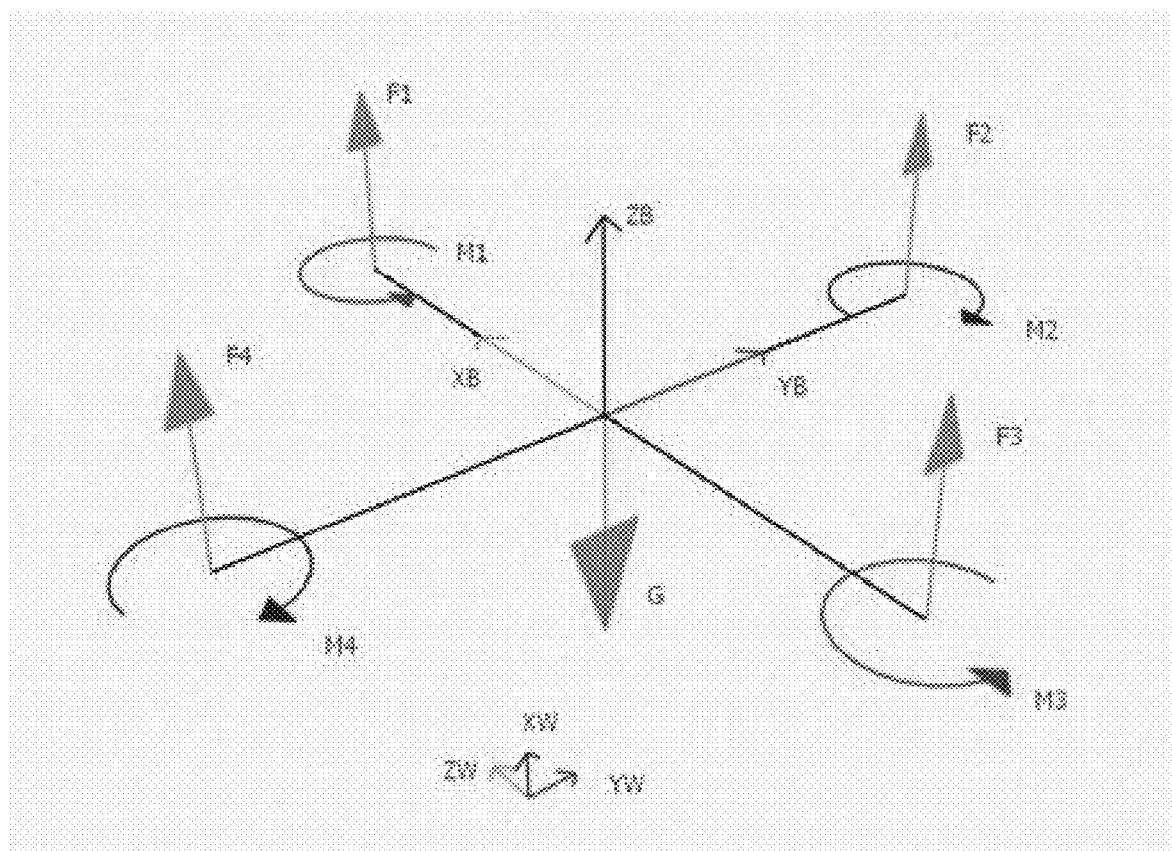
FIG. 1 is a simplified free body diagram, according to aspects of the present disclosure.

As shown in FIG. 1, there are two coordinates used in the mathematics calculation and simulation for the foldable UAV. The first one will be the body frame and second one to be the world frame.

The world frame will never change while the body frame is rotating and transporting with respect to the foldable UAV. To change the coordinates of the foldable UAV from body frame to world frame, the coordinates are multiplied by the rotation matrix shown as follows:

$$R = \begin{bmatrix} c\psi c\theta - s\phi s\psi s\theta & -c\phi s\psi & c\psi s\theta + c\theta s\phi s\psi \\ c\theta s\psi + c\psi s\phi s\theta & c\phi c\psi & s\psi s\theta - c\psi c\theta s\phi \\ -c\phi s\theta & s\phi & c\phi c\theta \end{bmatrix} \quad \text{Eq. 5.1}$$

$$C_w = RC_b \quad \text{Eq. 5.2}$$

In equation 5.1, 'c' represents 'cos' and 's' represents 'sin'. '$\phi$' is the roll angle, '$\theta$' is the pitch angle and '$\psi$' is the yaw angle. All the angles are in body frame. They are several equilibrium equations that the foldable UAV needs to follow to remain stable in the air for hovering.

$$mg = F_1 + F_2 + F_3 + F_4 \quad \text{Eq. 5.3}$$
$$F_1 = F_3$$
$$F_2 = F_4$$
$$M_1 - M_2 + M_3 - M_4 = 0 \quad \text{Eq. 5.4}$$

In equation 5.3, $F_1$ to $F_4$ are thrusts generated by each of the four rotors, rotor 1 and 3 are in main diagonal while 2 and 4 are in vice diagonal. 'm' is the total mass of the foldable UAV while 'g' is the gravitational acceleration constant. $M_1$ to $M_4$ are moments generated by each rotor. Under normal circumstances, rotor 1 and 3 rotates counter-clockwise while 2 and 4 rotate clockwise.

While the foldable UAV is in a dynamically stable condition, it will need to satisfy several equations as follow:

$$I \begin{bmatrix} \dot{p} \\ \dot{q} \\ \dot{r} \end{bmatrix} = \begin{bmatrix} L(F_2 - F_4) \\ L(F_3 - F_1) \\ M_1 - M_2 + M_3 - M_4 \end{bmatrix} - \begin{bmatrix} p \\ q \\ r \end{bmatrix} \times I \begin{bmatrix} p \\ q \\ r \end{bmatrix} \quad \text{Eq. 5.4}$$

In equation 5.4, L is the length of arm from the center of the foldable UAV to each of the rotor. 'p', 'q' and 'r' are the roll, pitch and yaw velocity of the frame. 'I' is the matrix of moment of inertia of the foldable UAV. Usually 'I' is an identity matrix with $I_{xx}$, $I_{yy}$ and $I_{zz}$ elements on the main diagonal. $I_{xx}$ equals to $I_{yy}$, and usually significantly smaller than $I_{zz}$, therefore it is usually easy to control foldable UAV to roll and pitch but harder to yaw.

Equation 5.4 is nonlinear, which greatly increases the complexity and unnecessarily slow down the simulation speed which can be linearized as follows:

$$I_{xx}\dot{p} = u_2 - qr(I_{zz} - I_{yy}) \quad \text{Eq. 5.5}$$

$$I_{yy}\dot{q} = u_3 - pr(I_{xx} - I_{zz}) \quad \text{Eq. 5.6}$$

$$I_{zz}\dot{r} = u_4 \quad \text{Eq. 5.7}$$

Here $u_2$, $u_3$, and $u_4$ are torques of the foldable UAV and $u_1$ is the net force on the z axis of the body frame. After linearizing the equations, equations 5.8 to 5.10 can be applied to obtain angular positions.

$$u_{2,des} = k_{p,\phi}(\phi^{des} - \phi) + k_{d,\phi}(p^{des} - p) \quad \text{Eq. 5.8}$$

$$u_{3,des} = k_{p,\theta}(\theta^{des} - \theta) + k_{d,\theta}(q^{des} - q) \quad \text{Eq. 5.9}$$

$$u_{4,des} = k_{p,\psi}(\psi^{des} - \psi) + k_{d,\psi}(r^{des} - r) \quad \text{Eq. 5.10}$$

Another way of obtaining the desired angular positions is to use equation 5.11 as follow.

$$u_{des} = \begin{bmatrix} k_F & k_F & k_F & k_F \\ 0 & k_F L & 0 & -k_F L \\ -k_F L & 0 & k_F L & 0 \\ k_M & -k_M & k_M & -k_M \end{bmatrix} \begin{bmatrix} \omega_{1,des}^2 \\ \omega_{2,des}^2 \\ \omega_{3,des}^2 \\ \omega_{4,des}^2 \end{bmatrix} \quad \text{Eq. 5.11}$$

From equation 5.1 to 5.11, based on desired initial location and destination, the Simulation program shall be able to generate desired location and gesture of the foldable UAV at different time, and based on that, the Pixracer controller can send signal to control the rotors.

The rotors on the other hand, follow their own dynamic model when receiving signals from the Pixracer controller.

The relation between thrust generated by the rotors and the rotation speed of the rotor is as shown in Equation 5.12, and relation between torque generated by the rotors and the rotation speed of the rotor is as shown in equation 5.13.

$$F_i = k_F \omega_i^2 \quad \text{Eq. 5.12}$$

$$M_i = k_M \omega_i^2 \quad \text{Eq. 5.13}$$

In equation 5.12 and 5.13, the two constants are measured from the rotors used in the experiment. The motors follow equation 5.14.

$$\dot{\omega}_i = k_m(\omega_i^{des} - \omega_i) \quad \text{Eq. 5.14}$$

Figure 7:
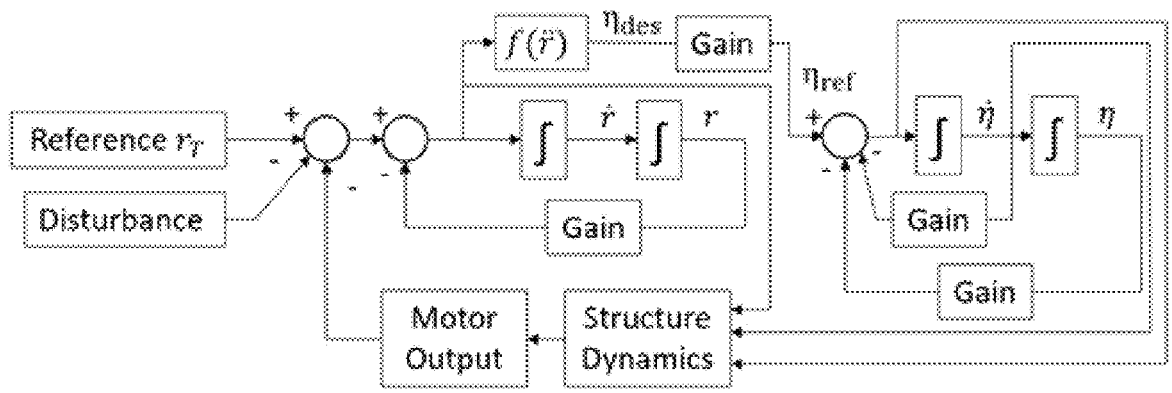
FIG. 7 is simplified block diagram showing a nested loop for altitude and position control of the foldable unmanned aerial vehicle, according to aspects of the present disclosure.

The total control loop of a foldable UAV is as shown in FIG. 7.

Simulation

Before applying simulation algorithm onto the platform, studying the simulation results and planning the process carefully can greatly reduce the chance of the foldable UAV to crash and achieve better control results.

The first simulation is to command the foldable UAV to do a quick linear transport between two 3D points using P control. The simulation is programmed using MATLAB and Simulink.

Firstly, input the initial locations and the destination location such that Simulink can generate trajectory according to the time line as shown in FIG. 8.

Referring to FIG. 8, the acceleration of the foldable UAV along the X axis depends on the current distance and the current velocity. As the foldable UAV moves closer to the destination, the acceleration of the foldable UAV will decrease conversely when the velocity of the foldable UAV increases, the acceleration will also decrease. There is limitation of the acceleration since the thrust generated by each motor is limited and the weight of the foldable UAV is significant. In addition to that, the motors used with the foldable UAV can either rotate clockwise or counter clockwise, which means its thrust will always be pushing the foldable UAV upward. Therefore, there are limitations and thresholds in this foldable UAV's either moments or thrusts. Because of the moments and thrusts limitations, p, q, r and their derivatives will also have limitations.

After obtaining the 3D trajectory, the next step is to apply equations 5.15 to obtain the angular velocity and acceleration through the timeline.

$$\phi^{des} = \frac{1}{g}(\ddot{r}_1^{des} \sin \psi_T - \ddot{r}_2^{des} \cos \psi_T) \quad \text{Eq. 5.15(a)}$$

$$\theta^{des} = \frac{1}{g}(\ddot{r}_1^{des} \cos \psi_T + \ddot{r}_2^{des} \sin \psi_T) \quad \text{Eq. 5.15(b)}$$

$$u_{1,des} = m\ddot{r}_3^{des} \quad \text{Eq. 5.15(c)}$$

Once that have been done, the Pixracer controller will be able to send signal to control the brushless motor to achieve desired acceleration and velocity. The moment of inertia of the FUAV follow the equations as below:

$$I_{xx} = I_{yy} = (1.05 \times 10^{-8} \cos \beta - 0.00631)$$
$$\sqrt{0.0029 - 0.002 \cos \beta} - 7.04 \times 10^{-5} \cos \beta + 5.77 \times 10^{-4} \quad \text{Eq. 5.16(a)}$$

$$I_{zz} = (2.1 \times 10^{-8} \cos \beta - 0.0106)$$
$$\sqrt{0.0029 - 0.002 \cos \beta} - 1.47 \times 10^{-4} \cos \beta + 0.0011 \quad \text{Eq. 5.16(b)}$$

Finally comparing the desired trajectory with the simulation results can show whether the trajectory planning model is suitable for the current mechanism for the foldable UAV.

Other embodiments related to the present disclosure are contemplated. For example, in one embodiment, the foldable UAV 100 may be formed with a plurality of arms that have more than one degree of freedom. In some embodiments, an embodiment of the UAV 100 may include a foldable quad-rotor (FQR) design and associated system, based on, or inspired by a laminate origami structure configured for in-flight morphing. The FQR is configured to fold its arms during flight to enable aggressive turning maneuvers and operations in cluttered environments. A dynamic model of folding may be built for the FQR system with the collected data, and a feedback controller is designed to control the position and orientation of the FQR. Lyapunov stability analysis may be conducted to show that the system is stable during arm folding and extension, and motion planning of the FQR is achieved based on a modified minimum-snap trajectory generation method. This FQR structure may be made of a laser-cut cardboard, which significantly reduces the cost and shortens the fabrication time.

Figure 9A:
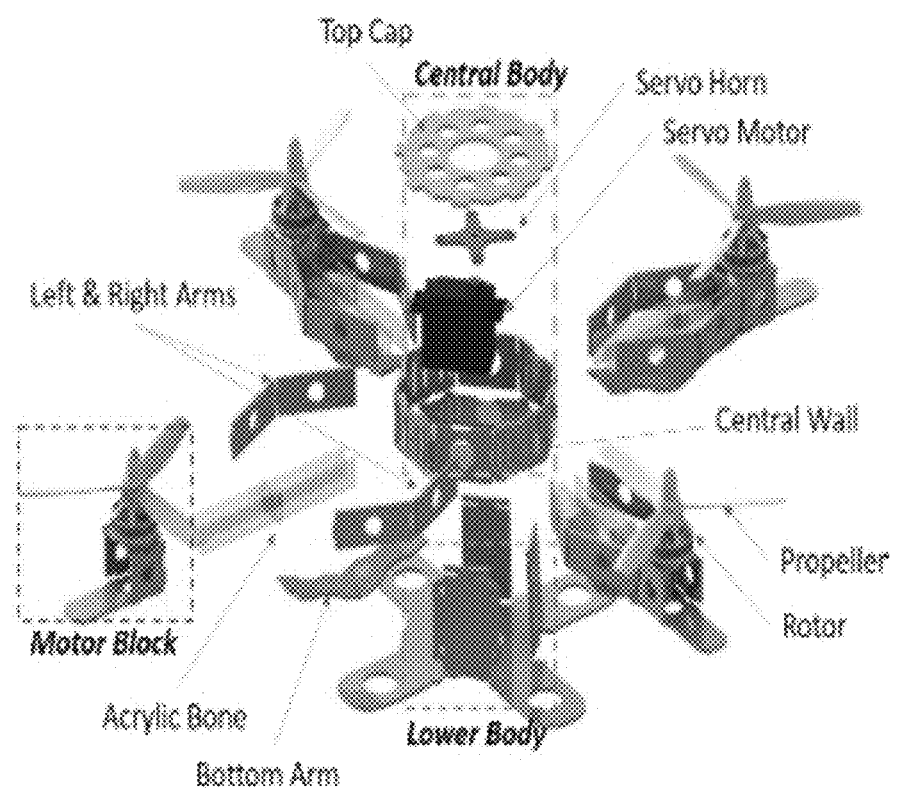
FIGS. 9A-9C depict other embodiments.
Figure 9B:
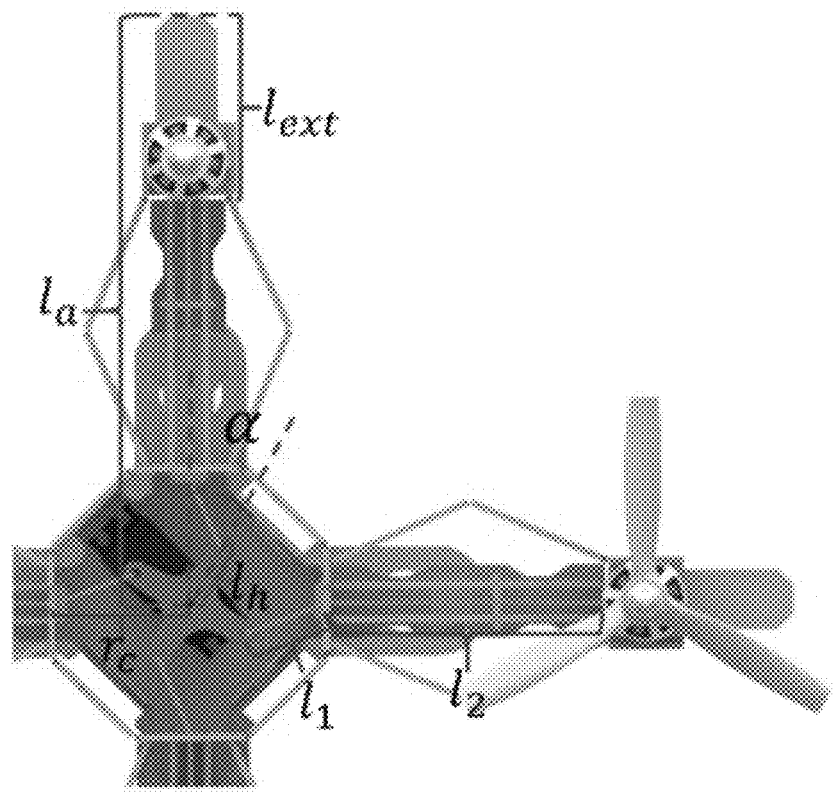

Referring to FIG. 9A, the FQR may be divided into a central body, lower body, motor blocks with acrylic bones, and arms that connects the motor blocks to the central body. A servo motor may be placed at the center of the central body with a cross-shape servo horn installed. The acrylic bones connect the motor blocks to the central body to avoid bending of the arms due to gravity of the motor blocks during flight. To allow in-flight folding and extending of the arms, a thread-actuated design may be implemented to pull back the motor block on each arm (and fold/retract the arms). Thread actuation is flexible and can be wired and mounted through complex structure. The principle of the thread-actuated design is shown in FIG. 9B. The notations and constants used in the figures and calculation are listed in Table X.

TABLE X

| Constants and Variables' Name | Notation |
| --- | --- |
| String length | $l_{str} \in R^+$ |
| Servo horn radius | $l_h \in R^+$ |
| Central body radius | $r_c \in R^+$ |
| Extended arm length | $l_{ext} \in R^+$ |
| Arm length | $l_a \in R^+$ |
| String length from servo horn to central wall | $l_1 \in R^+$ |
| String length from central wall to motor block | $l_2 \in R^+$ |
| Servo motor angle | $\alpha \in R^+$ |
| Total thrust | $u_1 \in R^+$ |
| Moment of the three axis in body frame | $u_2, u_3, u_4 \in R^+$ |
| Motor angle command to control arm length | $u_5 \in R^+$ |
| Position in the inertial frame | $r \in R^+$ |
| Rotation matrix of the FQR | $R \in R^{3 \times 3}$ |
| Euler angles in the inertial frame | $\theta \in R^3$ |
| Angular velocity in the inertial frame | $\omega \in R^3$ |
| Thrust from each group of motor and propeller | $F_i \in R^+$ |
| Moment from each group of motor and propeller | $M_i \in R^+$ |
| Rotor thrust constant | $k_F \in R^+$ |
| Rotor moment constant | $k_M \in R^+$ |
| Constant of the position error | $k_x \in R^+$ |
| Constant of the translational velocity error | $k_v \in R^+$ |
| Current/desired position | $x/x_d \in R^3$ |
| Current/desired translational velocity | $v/v_d \in R^3$ |
| Current/desired rotation matrix | $R/R_d \in R^{3 \times 3}$ |
| Current/desired body frame angular velocity | $\Omega/\Omega_d \in R^3$ |
| Unit vector along the Z axis of the inertial frame | $\varepsilon_3 \in R^3$ |
| Actual/desired moment of inertia matrix | $J/J_d \in R^{3 \times 3}$ |
| (Maximum) error between J and $J_d$ | $J_M/\tilde{J} \in R^{3 \times 3}$ |

One end of the thread may be mounted on the servo horn and the other end may be mounted on the motor block. When the servo motor rotates, the servo horn withdraws the threads and the motor blocks are pulled closer to the center of the FQR. When the servo motor reaches its maximum traveling distance and starts rotating in the opposite direction, because of the origami structure's spring effect, the arms will try to morph back to its original shape and the motor block will be pushed away from the center of the FQR.

Figure 9C:
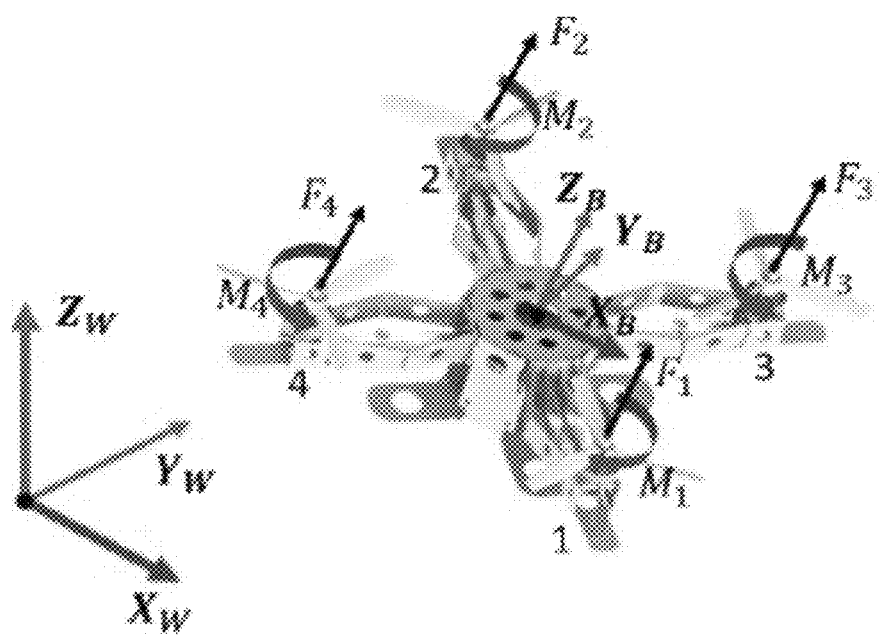

To model and control the FQR, a world frame and a body frame may be generated as shown in FIG. 9C. XW, YW, and ZW are the three axes in the inertial frame or world frame, which do not change or move during the flight of the FQR. The body frame, which includes XB, YB, and ZB, will translate and rotate along with the FQR. For each group of the rotor and propeller, the thrust and moment generated are Fi and Mi with respect to the notation number of the rotor.

The arm length of the FQR is controlled by a MG996R servo motor. When working under a constant load, the servo motor will maintain a constant rotation speed, and as the load increases, the servo rotation speed will slow until stalling. To calculate the desired motor angle, we start with calculating the corresponding servo angle based on the geometry relationship in FIG. 9B and Table X.

Further, the FQR system uses the Layapunov stability method to prove that the FQR is stable and the error for both translational and rotational movement can converge. Because of the additional one degree of freedom of the FQR, the rotational dynamics of the FQR is different from a normal quad-rotor. The system modifies the moment input to account for the changing arm length in the attitude control loop.

In short, the origami-inspired FQR was developed using cardboard. With its arms extended or folded, the FQR may change the moment of inertia and ambient air flow velocity. A feedback controller was developed to guarantee stability with changing arm lengths, and the minimum snap trajectory generation approach was extended to plan the position, yaw angle, and the arm length.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. An unmanned aerial vehicle comprising:
   a structure, the structure defining:
      a plurality of arms defined along a periphery of the structure, the plurality of arms configured for variable length relative to a center portion of the structure, wherein each arm of the plurality of arms is operable to fold to shorten a length of the arm and wherein each arm is operable to unfold to increase the length of the arm,
      a plurality of mountings, wherein each mounting of the plurality of mountings is respectively formed at an end portion of each arm of the plurality of arms of the structure;
   a plurality of motors, a motor of the plurality of motors being housed within each of the plurality of mountings of the structure;
   a plurality of propellers in operative communication with the plurality of motors for propelling the foldable unmanned aerial vehicle during flight;

a string and spring mechanism associated with each respective arm of the plurality of arms for altering a length of each arm of the plurality of arms, wherein the string and spring mechanism includes:
  a servo motor associated with the center portion of the structure,
  a wheel in operable engagement with the servo motor, and
  a plurality of strings in operative engagement to the wheel and to respective ones of the plurality of arms, wherein engaging the servo motor turns the wheel and tensions the plurality of strings which consequently shortens the length of each arm of the plurality of arms relative to the center portion of the structure; and
a processor in operative communication with the plurality of motors that controls operation of the plurality of motors, the processor further configured for controlling the string and spring mechanism to alter the length of each arm of the plurality of arms of the structure such that a motor associated with the each arm is drawn towards or forced away from the center portion of the structure.

2. The method of claim 1, wherein the plurality of arms are restricted to one degree of freedom such that altering the length of an arm of the plurality of arms moves a respective motor of the plurality of motors towards or away from the center portion of the structure.

3. The method of claim 1, wherein the string and spring mechanism includes:
  a plurality of springs in operative engagement with a respective arm of the plurality of arms, wherein the spring is biased in an extended state such that the arm is biased in an extended configuration.

4. The method of claim 1, wherein the processor and the string and spring mechanism are configured for symmetric or asymmetric articulation of the plurality of arms, such that each arm of the plurality of arms is operable to extend outwardly at a variable distances relative to one another during flight to influence rotation of the unmanned aerial vehicle.

5. The method of claim 1, wherein the processor is configured to control flight of the unmanned aerial vehicle using a dynamic closed loop control system that considers structure dynamics for output of the plurality of motors, wherein the dynamic closed loop control system is modified to account for alteration of the length of the arms during flight of the vehicle.

6. The method of claim 1, wherein the structure is comprised of a multi-laminate cardboard.

7. A method of making a foldable unmanned aerial vehicle comprising:
  providing a multi-layer laminate;
  cutting a plurality of layers from the multi-layer laminate;
  arranging the plurality of layers in a predetermined configuration relative to one another to form a structure, the structure defining a plurality of arms defined along a periphery of the structure; and
  mounting a motor-propeller assembly along each of the plurality of arms; and forming a string and spring mechanism associated with each respective arm of the plurality of arms for altering a length of each arm of the plurality of arms, wherein the string and spring mechanism includes:
  a servo motor associated with the center portion of the structure;
  a wheel in operable engagement with the servo motor; and
  a plurality of strings in operative engagement to the wheel and to respective ones of the plurality of arms, wherein engaging the servo motor turns the wheel and tensions the plurality of strings which consequently shortens the length of each arm of the plurality of arms relative to the center portion of the structure.

8. The method of claim 7, further comprising controlling the string and spring mechanism using a processor, the processor configured for controlling the string and spring mechanism to alter the length of each arm of the plurality of arms in order to accommodate predetermined rotation of the unmanned aerial vehicle, wherein the processor is further configured to account for alteration of the length of the arms during flight of the unmanned aerial vehicle.

9. A foldable unmanned aerial vehicle comprising:
  a structure comprising a multi-layered laminate;
  a plurality of extendable arms coupled to the structure and operable by one or more motors for variable length based on one or more control signals;
  a plurality of propellers operable for propelling the foldable unmanned aerial vehicle during flight by one or motors based on one or more control signals;
  a spring-string mechanism associated with each respective extendable arm of the plurality of extendable arms for altering a length of the extendable arm, wherein the string and spring mechanism includes:
    a servo motor associated with the center portion of the structure;
    a wheel in operable engagement with the servo motor; and
    a plurality of strings in operative engagement to the wheel and to respective ones of the plurality of arms, wherein engaging the servo motor turns the wheel and tensions the plurality of strings which consequently shortens the length of each arm of the plurality of arms relative to the center portion of the structure; and
  a processor in operative communication with the one or more motors for providing the one or more control signals to the one or more motors.

10. The foldable unmanned aerial vehicle of claim 9, wherein a respective arm of the plurality of extendible arms is associated with a respective motor of the one or more motors.

11. The foldable unmanned aerial vehicle of claim 10, wherein an alteration of the length of at least one extendible arms controls the rotation of the foldable unmanned aerial vehicle during flight and wherein the processor accounts for alteration of the length of the at least one extendible arm during flight of the vehicle.

12. The method of claim 1, wherein a spring in operative engagement with a respective arm of the plurality of arms is forcibly compressed between the motor of the arm and the center portion of the structure when an associated string of the plurality of strings is tensioned.

* * * * *